United States Patent [19]
De Carolis

[11] 3,812,422
[45] May 21, 1974

[54] APPARATUS FOR MEASURING THE LEVELS OF FLUIDS AND THE DIELECTRIC CONSTANTS OF THE SAME

[75] Inventor: Massimiliano De Carolis, Rome, Italy

[73] Assignee: Comitato Nazionale per l'Energia Nucleare, Rome, Italy

[22] Filed: Aug. 28, 1972

[21] Appl. No.: 283,980

[30] Foreign Application Priority Data
Sept. 4, 1971  Italy................................. 52680/71

[52] U.S. Cl............................ 324/58.5 B, 73/304 R
[51] Int. Cl............................................. G01r 27/04
[58] Field of Search............... 324/58.5 B; 73/304 R

[56] References Cited
UNITED STATES PATENTS

| | | |
|---|---|---|
| 3,572,119 | 3/1971 | Bak........................... 324/58.5 B X |
| 3,626,284 | 12/1971 | Bak................................ 324/58.5 B |
| 2,938,383 | 5/1960 | Blackburn..................... 73/304 R X |
| 3,003,355 | 10/1961 | Wright........................... 73/304 R X |
| 3,142,830 | 7/1964 | Patrick et al.................. 73/304 R X |
| 3,695,108 | 10/1972 | Wygant.......................... 73/304 R X |

Primary Examiner—Stanley T. Krawczewicz
Attorney, Agent, or Firm—Stevens, Davis, Miller & Mosher

[57] ABSTRACT

A device is herein disclosed for measuring the changes of impedance along the path of an electric signal. More specifically, according to this invention the changes of impedance along a coaxial cable connected to a pulse generator are measured and through such measures the distances are measured between a reference point along the cable and the points where the the changes of impedance occur. Particularly this invention relates to a device for accurately determining the interfaces level between liquid masses and the dielectric constants of said liquids.

4 Claims, 6 Drawing Figures

APPARATUS FOR MEASURING THE LEVELS OF FLUIDS AND THE DIELECTRIC CONSTANTS OF THE SAME

This invention relates to a device for measuring the changes of impedance along the path of an electric signal. More specifically, according to the invention, the changes of impedance along a coaxial cable connected to a pulse generator are measured and through such measures the distances are measured between a reference point along the cable and the points where the changes of impedance occur.

As known, when a coaxial cable is connected to a source of signals, these are transmitted over the cable and their transmission is influenced by the propagation characteristics of the cable which are as follows:

1. $\alpha$ = neper attenuation per length unit
2. $\beta$ = phase displacement angle in radians
3. $Z_o$ = characteristic impedance of the cable.

Any impedance change along the cable causes a reflection of the incident signal and, as a consequence, the signal will undergo a change at the point where such reflection occurs which change will be positive or negative depending on whether the reflected signal will be inphase or counter-phase with respect to the incident signal.

The reflection factor can be measured by means of any suitable instrument such as an oscilloscope connected to the pulse generator and calibrated to read on the ordinate axis the reflection factor $\rho$ that is the ratio between the magnitude of the reflected signal and the incident signal magnitude and on the abscissa axis the time intervals and consequently the distances travelled by the reflected signals.

By such arrangement the impedance changes can be determined and referred to their positions along the line.

An impedance change can be produced either by a change in the dielectric constant along the line or by a structural change along the line.

In fact the impedance Z of a coaxial line is given by $Z = (138/\sqrt{e})\lg_{10} b/a$ where:

$e$ is the dielectric constant of the transmission medium $b$ is the inner diameter of the outer conductor $a$ is the outer diameter of the inner conductor.

For a given coaxial line of which the cross-section and the dielectric constant remain unchanged over the whole length thereof, a value $Z_o$ of its impedance can be calculated which is called characteristic impedance of the line.

If a change occurs at a given point along the transmission line either of the dielectric constant due for instance to a change of the medium through which the signal propagates or of the cable dimensions such that $Z_o$ is modified into a different value, e.g. Z, then at such point a change of the reflection factor and as a consequence a change of the signal strength will occur.

Any change of the reflection factor which appears on the oscilloscope screen will permit to localize the corresponding impedance change along the line. Specifically, if the measuring coaxial line penetrates two distinct media of which the dielectric constants are different, the position can be determined along the line of the interface between the two media. Furthermore, because a change of impedance is caused by a change of the dielectric constant, the dielectric constant of a medium different from air can be determined by measuring the magnitude of the dielectric constant change at the interface between the air and a medium of which the dielectric constant is different from that of air.

If $\rho$ is the magnitude of the dielectric constant change, then the dielectric constant e of said medium is given by $e = (1 - \rho/1 + \rho)^2$ Furthermore the length of the path travelled in a time unit by a signal through a medium, other than air, of unchanging dielectric constant is given by $$D = (D_A/\sqrt{e}) \qquad \text{where}$$

$D_A$ is the distance of the path travelled by the signal in air in a time unit;

$e$ is the dielectric constant of the medium passed through.

The above formulae can be applied for determining the value of the dielectric constant of a liquid, the level of a liquid stationary in a vessel or moving through a duct, the levels of the interfaces between two or more liquids or gases having different dielectric constants; specifically for determining the thickness of an emulsion layer overlying a liquid mass.

Particularly this invention relates to a device for accurately determining the interfaces level between liquid masses and the dielectric constants of said liquids.

Due to the structural feature of the device, such measures can be effected both with organic and with inorganic liquids. Due to the same structural feature, the device of this invention lends itself for effecting the above measures both with liquids stationary in a vessel and with liquids flowing through ducts; for example it can be used for measuring the interface level between the two liquids in a mixer-settler of an extraction battery in a plant for reprocessing nuclear fuels.

The invention will be more clearly understood from the following description and from the accompanying drawings which illustrate, as a non limitative example, a perferred embodiment thereof.

Figure 1A:
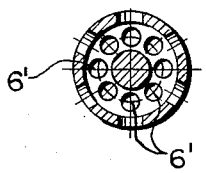
FIG. 1a shows a cross-section along line A—A of the device of FIG. 1.
Figure 1:
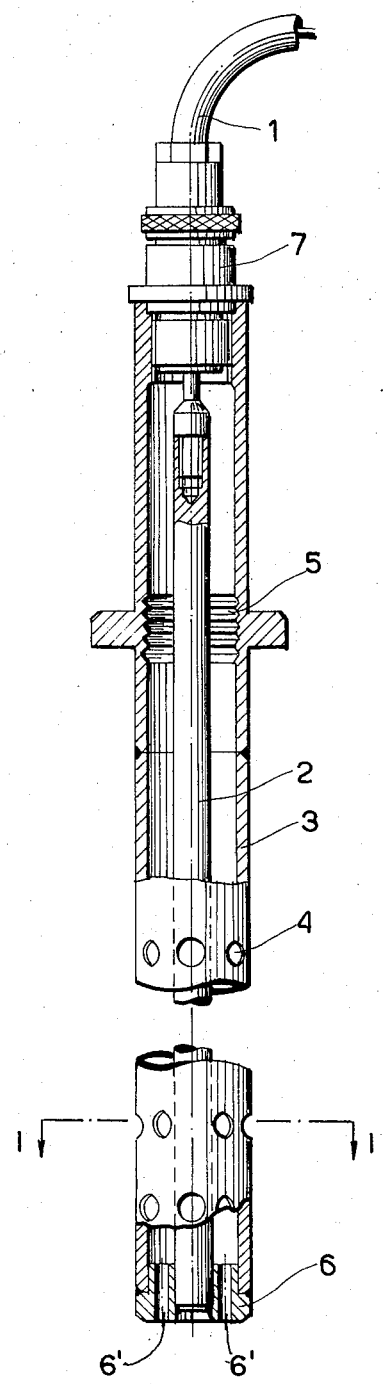
FIG. 1 is an elevation view partly cut away of the device according to this invention.

With reference to FIG. 1 which illustrates the device of the invention, this comprises a cylindrical central conducting rod 2 which will be preferably made of stainless steel when intended for being used with acid liquids which rod is surrounded by a cylindrical coaxial tube 3 also of stainless steel. Said tube is suitably perforated in order to permit the surrounding fluid to freely flow into the tube so that the fluid inside the tube is substantially representative of surrounding medium.

Figure 2:
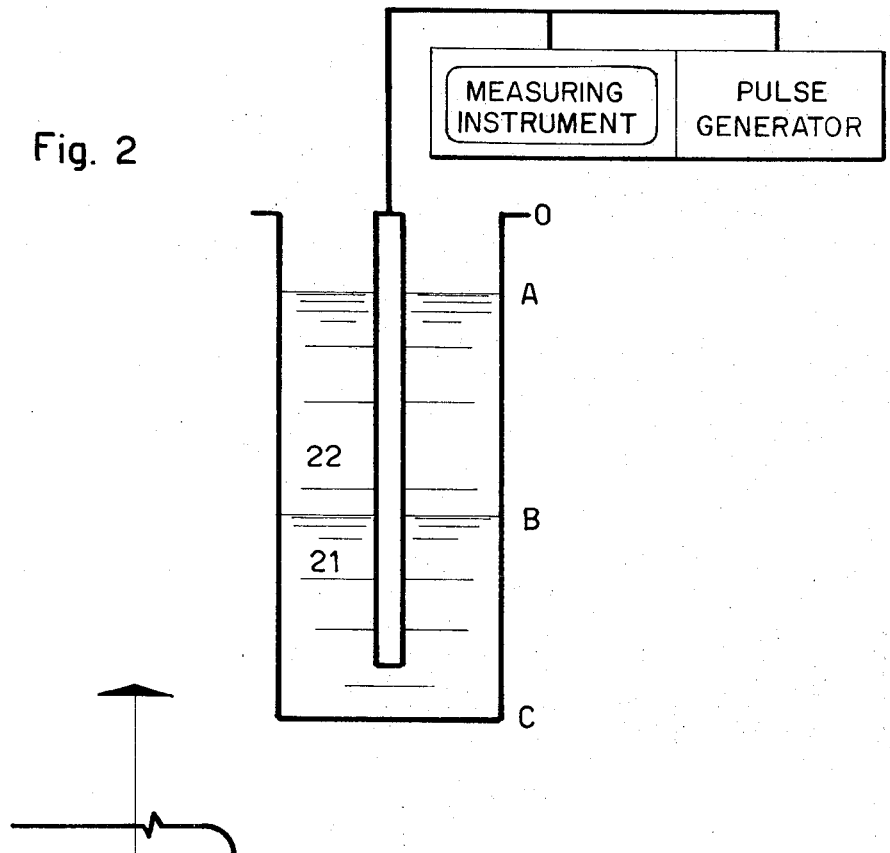
FIG. 2 shows schematically a vessel containing two liquids phases, specifically an aqueous phase and an overlying organic phase of which the interface level is to be measured.

Rod 2 is held centered within tube 3 at the upper end thereof by means of a ceramic ring or similar material — the seat 5 only of this ring being shown in FIG. 2 — of which the purpose is for ensuring a liquidtight and gastight seal.

At the lower end a short circuit is provided between the tube 3 and the conducting rod 2 by means of a perforated plug 6 of stainless steel. More specifically plug 6 comprises a cylindrical hollow block of which the inner diameter is equal to the outer diameter of rod 2 and the outer diameter is equal to the inner diameter of tube 3 so that, when inserted between said two elements, plug 6 closes the bottom end of the space defined by them. A crown of vertical bores 6' are provided through the plug at regular intervals along a circle coaxial with rod 2 and tube 3. The purpose of bores 6' is for draining all the liquid from said space when the device is withdrawn from the vessel wherein the fluid 21,22 are contained of which the interface level is to be measured.

The short circuit formed with plug 6 is an essential feature of this invention: in fact, as it will be explained hereinafter, the short circuit permits the use of the measuring device of this invention both with organic and with inorganic liquids in as much as due to the short circuit the device operation is not influenced by the presence of any electric changes in the liquids to be measured and does not require any calibration when these are changed.

The device so far described which will be called probe is connected through a coaxial cable 1 to a conventional instrument adapted for measuring the reflection parameters of high frequency signals in the GHz range.

The dimensions of the cable and of the probe are such that for a given dielectric — e.g. polyethylene — of the cable and for a given dielectric — e.g. air — of the probe, they both have the same impedance.

Coaxial cable 1 is connected to the probe by means of a connector 7 such that the least impedance change is caused at the point where the homologous conductors of the cable and of the probe are reciprocally connected. In practice connector 7 inevitably causes a slight impedance change.

The reflected signal is evidenced by means of a reading unit such as an oscilloscope.

On the screen of the cathode ray tube of the oscilloscope the values of the reflection factor are read on the ordinate axis. To this purpose the oscilloscope is suitably calibrated so that for instance a distance of 10 cm along the ordinate axis corresponds to a reflection factor unit. On the abscissae the time interval is read between the instant when the signal is originated and the instant when it is reflected.

Because the velocity is known of the pulse — which in the case of air is 300,000 km per sec — the distance can be determined between the point where the pulse originates and the point where the signal is reflected. As a consequence, the abscissae axis of the instrument can be calibrated to directly read the distance between said points.

Figure 3A:
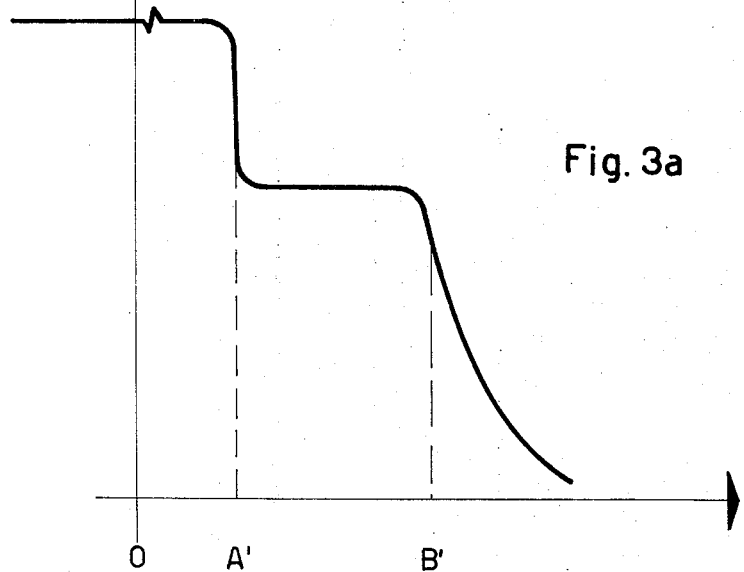
FIG. 3a shows the signal curve as it appears on the oscilloscope screen when the device of this invention is introduced into the vessel of FIG. 2.
Figure 3:
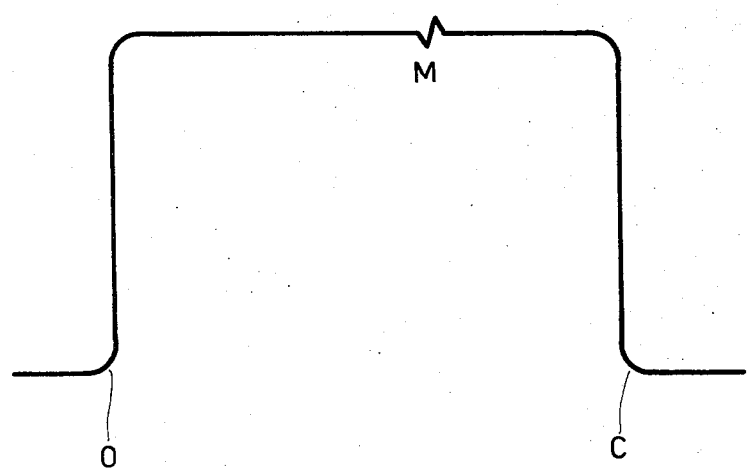
FIG. 3 shows the signal curve as it appears on the oscilloscope screen when no impedance changes occur along the cable.

The trend of the signal on the oscilloscope screen when the whole probe is immersed in air is shown in FIG. 3. On the abscissae the distances are shown from the point where the signal 0 originates and the point C where the short circuit is located.

The curve of FIG. 3 will include a peak of moderate size. This is caused by the small impedance change at connector 7, as already said. Said peak indicates the distance from connector 7 to the point where the signal originates.

Before and after said peak the reflection factor has the same value. This, as stated above, is due to the fact that by suitably dimensioning the coaxial cable and the probe they are made to have the same impedance although the inner insulation of the cable is made of polyethylene, while the probe insulation is made of air.

For better clarifying the function of the short circuit 6, it is pointed out that in the absence of such short circuit the operation of the device would be disturbed and wrong measures would be obtained in those cases when the probe would be immersed into ionic liquids due to the fact that potential differences would arise across the two separate elements of the device, that is between rod 2 and tube 3. Such potentials, which would be called spurious potentials, appear to be rather fickle and totally irreproducible. Values of such potentials have been measured at steady state and found to vary between zero and some tenths millivolt.

Before attaining the steady state, peak values can occur up to some hundreds millivolts of the spurious potentials.

A shifting along the abscissae axis of the curve on the oscilloscope screen would be the consequence of said potentials. The magnitude of said shifting varies with the varying spurious potentials so that it will change when the liquid to be measured changes.

With the measuring devices of the prior art it would be wearisome to center the curve on the oscilloscope screen for a given liquid and to keep it stable. Besides, the spurious potentials are liable to endanger the apparatus. The short circuit located at the end of the device permits to overcome this drawbacks and to effect the desired measures in spite of the very high operating frequencies.

As a non limitative example of the manner in which the device of this invention can be applied, the measuring operation is described of the interface level between two liquid phases in a mixer-settler of an extraction battery included in a plant for reprocessing nuclear fuels.

In the settler of which the diagram is shown in FIG. 2 an organic phase 22 is usually present which overlies an aqueous phase 21. The probe which has been previously connected to the instrument for measuring the reflection factor is to be calibrated with regards to the distances travelled by the refection signals. To this purpose, the probe is attached to the vessel at a well determined height with respect to it in such a way that the distance, for example, between the conductor which produces the known peak on the oscilloscope screen — which peak will be called marker — and a fixed point of the vessel is well known and constant.

Short circuit 6 also can be chosen as a reference level provided it produces a sharp wriggle of the reflection factor curve on the oscilloscope such that the distance of said wriggle from the abscissae origin can be readily measured. Such conditions however do not occur with all liquids.

The course of the signal along the probe is shown by FIG. 3a. The peak between abscissae O' and A' is caused — as already said — by the impedance change at connector 7.

The interval A'–B' on the abscissae axis corresponds to the difference between the levels of the interface air-organic phase and of the interface organic phase-aqueous solution, that is to the distance travelled by the signal through the organic phase.

Because the probe is calibrated in air, the values read on the abscissae axis are true till abscissa A' which corresponds to the interface air-organic phase. In other words, when the top level of the liquid phase only is to be measured, this can be done by simply measuring on the abscissae axis the distance between the origin and the abscissa at which the first signal drop occurs. Such distance corresponds exactly to the distance between the upper level of the liquid phase and the reference level.

On the other hand the distance read on the abscissae axis beyond abscissa A' are to be corrected for the dielectric constant of the medium by means of the following formula $$D = [D_A(\text{air})/\sqrt{e}]$$

(1)

where $D_A$ is the distance travelled in air $e$ is the dielectric constant of the medium. The dielectric constant of the organic phase can be determined by the device itself. In fact the value of $e$ can be deduced from the amplitude of the reflected signal by means of the formula:

$$e = (1 - \rho/1 + \rho)^2$$

(2)

where $\rho$ is the reflection factor.

Figure 4:
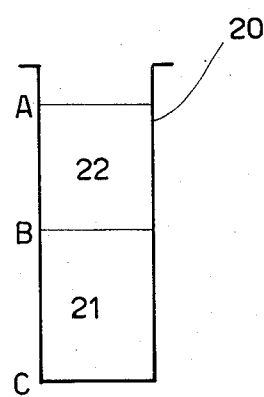
FIG. 4 is a diagram for reference with an example in the disclosure.

The data are now reported of a practical measuring operation given by way of example only with reference to FIG.4.

In vessel 20 a layer 21 of aqueous solution and an overlying layer of organic liquid 22 are contained the latter layer being 28 cm thick.

After connecting the probe of this invention to an instrument for reflection measures, a distance of 52 cm has been measured between the upper level of liquid 22 and the upper level of liquid 21. This distance has been corrected by means of formula (1) as previously explained. Because the value of the dielectric constant of liquid 22 was not known, this has been determined through the value of the reflection factor reading on the oscilloscope screen which was 0.296. From this factor the value of $\sqrt{e}$ has been calculated by means of formula (2). A value of 1.84 has been found.

By means of formula (1) the distance has been calculated between the organic liquid-aqueous solution interface and the upper lever of the liquid.

$$D = (52/1.84) = 28.3$$

The 3 mm error with respect to the actual distance is to be considered within the accuracy of the method.

What is claimed is:

1. A device for measuring the levels of fluid masses and more specifically the levels of interfaces between fluids of different dielectric constants which device comprises a probe made to two spaced cylindrical coaxial rigid conductors with vertical axis which probe is connected by means of a coaxial cable affixed at the upper end of the probe to a generator of pulses in the range of GHz frequencies and to an instrument for measuring the time intervals between the instant when each of said pulses originates from said generator and the instant when it returns to said instrument after being reflected by said interfaces in which device the two probe conductors are connected to one another at the lower ends thereof by means of a conducting element of low resistance such that a short circuit is established thereby for the electrochemical currents which originate across said two elements due to the presence between them of the fluids of which the levels are to be measured.

2. A device for measuring the levels of fluids as per claim 1, characterized by the fact that said conducting element of low resistance comprises a metal plug inserted between the two cylindrical coaxial conductors at the lower end thereof which metal plug is provided with a crown of bores of which the axes are parallel to the probe with the purpose of draining from the space between said elements any liquid when the probe is withdrawn from the vessel in which the liquids to be measured are contained.

3. A probe for measuring the levels of fluids as per claim 1, characterized by the fact that the outer cylindrical conductor of said probe is provided with perforations regularly distrubuted over that section of the probe which extends between the lowermost and the uppermost levels to be presumably reached by the liquid interface to be measured.

4. A probe for measuring the levels of fluids as per claim 3 characterized by the fact that above the perforated section of the outer cylindrical conductor, a means is provided for closing the space between said two probe conductors and for centering the inner conductor of the probe within the outer conductor thereof.

* * * * *